United States Patent [19]

Baltusis et al.

[11] Patent Number: 4,823,266
[45] Date of Patent: Apr. 18, 1989

[54] CONTROL OF ENGINE SPEED WITH AUTOMATIC TRANSMISSIONS

[75] Inventors: Paul A. Baltusis, Northville; Lawrence H. Buch, Farmington Hills; Richard S. Holcomb, Dearborn; Leonard J. Kurdziel, Westland; Gerald W. Rein, Dearborn Heights, all of Mich.

[73] Assignee: Ford Motor Company, Dearborn, Mich.

[21] Appl. No.: 102,223

[22] Filed: Sep. 29, 1987

[51] Int. Cl.⁴ .................. G06F 15/50; G06G 7/70
[52] U.S. Cl. ................................ 364/424.1; 74/866
[58] Field of Search .................. 364/424.1; 74/866

[56] References Cited

U.S. PATENT DOCUMENTS

| 4,346,625 | 8/1982 | Latsch et al. ............... 74/866 |
| 4,401,073 | 8/1983 | Furuhashi ................. 123/339 |
| 4,434,778 | 3/1984 | Morita et al. ............ 123/585 X |
| 4,474,153 | 10/1984 | Hanamoto et al. ......... 123/339 |
| 4,520,694 | 6/1985 | Eschrich et al. .......... 74/866 X |
| 4,531,672 | 7/1985 | Smith ..................... 123/446 X |
| 4,720,792 | 1/1988 | Kasai et al. .............. 364/424.1 |

FOREIGN PATENT DOCUMENTS 0184753 11/1982 Japan .................. 364/424.1

Primary Examiner—Eugene R. LaRoche
Assistant Examiner—Nathan W. McCutcheon
Attorney, Agent, or Firm—Peter Abolins; Clifford L. Sadler

[57] ABSTRACT

Controlling the speed of an engine used with an automatic transmission to reduce tip in jerk includes determining any difference between transmission gearset speed and engine speed. Engine speed is increased if it is below transmission gearset speed so as to reduce any speed differential between the engine and transmission gearset.

12 Claims, 4 Drawing Sheets

FIG.6A
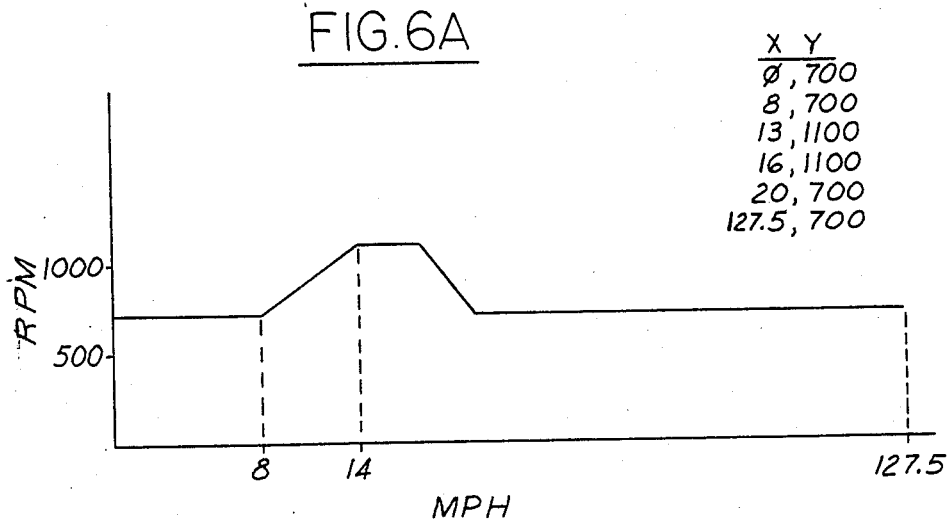
| X | Y |
|---|---|
| 0, | 700 |
| 8, | 700 |
| 13, | 1100 |
| 16, | 1100 |
| 20, | 700 |
| 127.5, | 700 |
FIG.6B
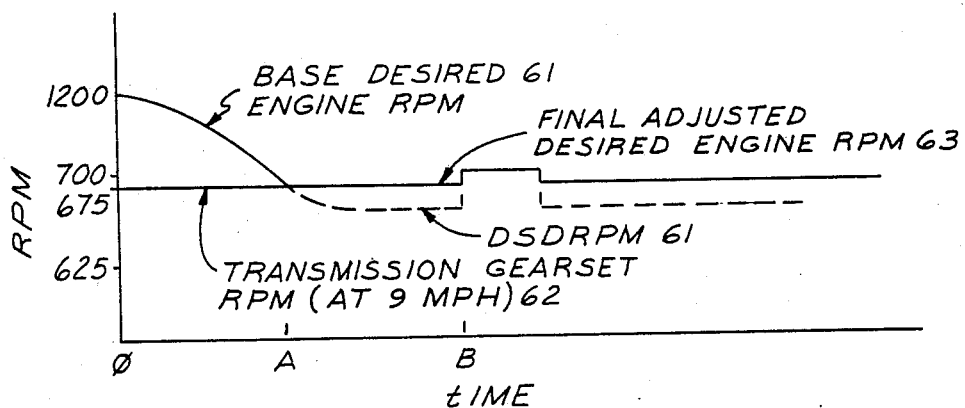
FIG.7
| S | C | Q |
|---|---|---|
| 1 | 0 | 1 |
| 0 | 1 | 0 |
| 0 | 0 | N/C |
| 1 | 1 | 1 |

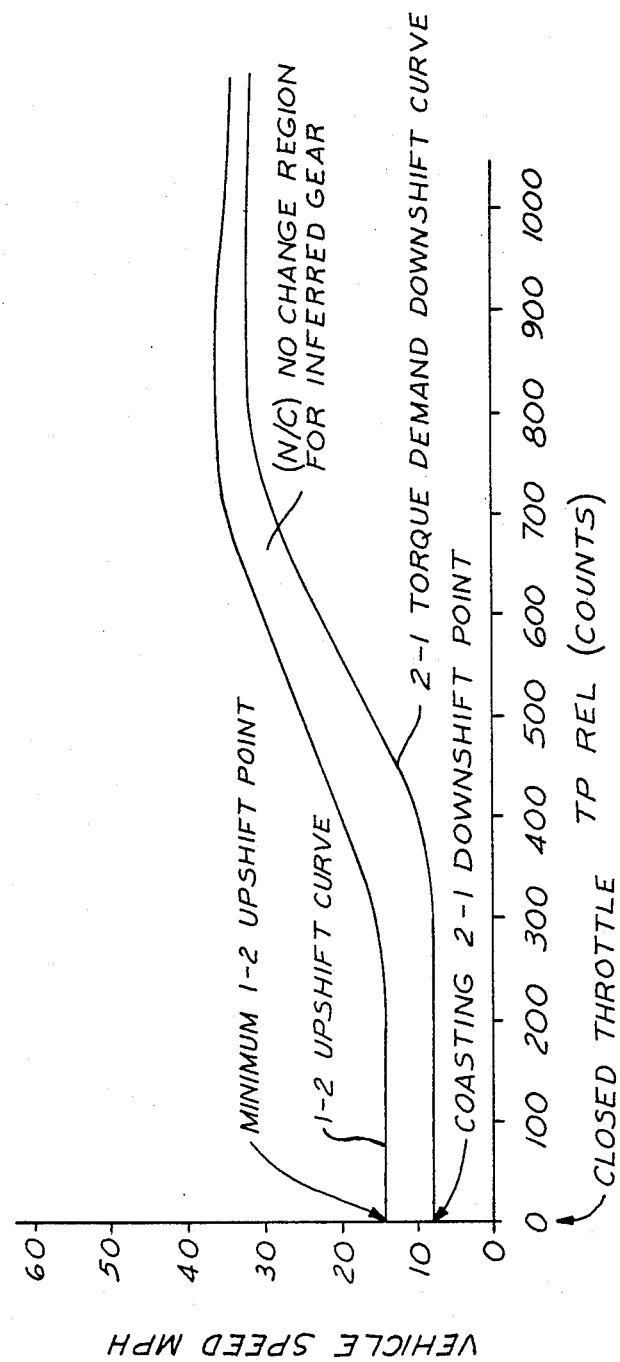

CONTROL OF ENGINE SPEED WITH AUTOMATIC TRANSMISSIONS

BACKGROUND OF THE INVENTION

1. Field of the Invention

This invention relates to electronic engine controls used in conjunction with an automatic transmission.

2. Prior Art

A historic problem with automatic transmissions is the jerk which occurs when the driver tips in (i.e., opens the throttle to accelerate) from closed throttle at a non-zero vehicle speed, usually in a gear where there is no engine braking. This problem has been found to be more pronounced in front-wheel drive cars than in rear-wheel drive cars. Driveline compliance seems to reduce the jerk, and rear-wheel drive cars have more driveline compliance than front-wheel drive cars. Thus, the growing popularity of front-wheel drive cars has accentuated this jerk problem.

At closed throttle, the engine rpm is at idle when there is no engine braking, regardless of vehicle speed. The transmission gearset speed is a function of the vehicle speed and the particular engaged transmission gear. The gearset speed is almost always higher than the engine speed in low gears and at low vehicle speeds. If the driver opens the throttle (tips in), the engine accelerates freely and rapidly because it is decoupled from the rest of the driveline. This rapid acceleration continues until engine speed reaches the speed of the transmission gearset, at which point the driveline lash is taken up and the transmission begins carrying torque. The result is an objectionable clunk or jerk. That is, jerk results from a high rate of rise in axle torque which is caused by the change from negative torque (deceleration) to positive torque (tip in), accelerating the driveline inertia through the lash. Note that tip in jerk still occurs even in higher gears with engine braking, but with far less severity due to the action of the torque converter and the numerically lower gear ratios.

As illustrated in FIG. 1, when vehicle operation is at closed throttle at 15 mph, engine rpm is at 700 rpm at point A and transmission gearset is at 1200 rpm at point B. If the driver opens the throttle, engine rpm rapidly rises to point B, 1200 rpm, and the transmission applies torque to the wheels. Tip in clunk occurs here as the driveline lash is taken up as torque is applied.

Various electronic control functions are known. U.S. Pat. No. 4,346,625 issued to Latsch et al teaches controlling engine roughness. U.S. Pat. Nos. 4,401,073 issued to Furuhashi and 4,474,153 issued to Hanamoto et al teach idle speed control systems which attempt to differentiate between the acceleration conditions for a vehicle and true idle conditions for a vehicle where it is desired to do idle speed control. U.S. Pat. No. 4,520,694 issued to Eschrich et al describes torque reduction on transmission shifts to improve transmission shift quality. However, these patents neither teach nor suggest a solution to tip in clunk occurring when driveline lash is taken up as torque is applied. These are some of the problems which this invention overcomes.

SUMMARY OF THE INVENTION

Engine idle speed control is used to vary engine speed as a function of vehicle speed and transmission gear. In accordance with an embodiment of this invention, engine speed is matched with transmission gearset speed to either apply positive torque to the transmission or to minimize the speed difference between the transmission and the engine. Advantageously, the transmission gear is inferred so that no additional physical sensors are necessary and no additional hardware cost is necessary. Thus, this invention includes recognition that tip in jerk can be eliminated by increasing engine airflow during vehicle deceleration so that axle torque remains positive.

BRIEF DESCRIPTION OF THE DRAWINGS

FIG. 6A is a graphical representation of desired engine rpm when first gear is engaged versus the average vehicle speed;

FIG. 6B is a graphical representation of time versus rpm for a base desired engine rpm (DSDRPM) curve, a transmission gearset rpm at a given vehicle speed and a final adjusted desired engine rpm in accordance with an embodiment of this invention;

FIG. 7 is a truth table for the inputs (S,C) and output (Q) of a logic function for determining a desired engine rpm; and FIG. 8 is a graphical representation of shift points on axes of throttle position (TP REL COUNTS) versus vehicle speed (MPH).

DETAILED DESCRIPTION OF THE INVENTION

Figure 2:
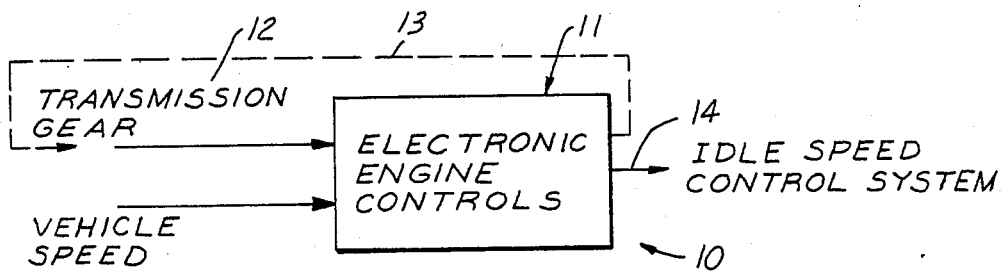
FIG. 2 is a block diagram of an electronic engine control used to control engine idle speed as a function of transmission gear and vehicle speed in accordance with an embodiment of this invention.

Referring to FIG. 2, an engine control system 10 includes an electronic engine control module 11 which has an input 12 indicating the selected transmission gear, which, if desired, can be generated by electronic engine control module 11 as indicated by dashed feed back line 13. Electronic engine control module 11 also includes an input 13 indicating vehicle speed. An output 14 from electronic engine control module 11 provides a signal for an engine idle speed control system.

Engine control module 11 operates by generating a base desired engine idle speed control signal as a function of engine operating parameters such as engine coolant temperature, elapsed time since engine start, engine air charge temperature, neutral-drive gearshift selection, air conditioner actuation, and power steering actuation. Some of these require additional inputs into engine control module 11 which are not shown in FIG. 2 but are well known in the art. The base desired engine idle speed is adjusted as a function of transmission gearset speed to a final adjusted desired engine idle speed. Advantageously, the adjustment to the base desired engine idle speed is accomplished without additional hardware sensors by inferring transmission gearset speed from vehicle speed and the selected transmission gear ratio.

Figure 1:
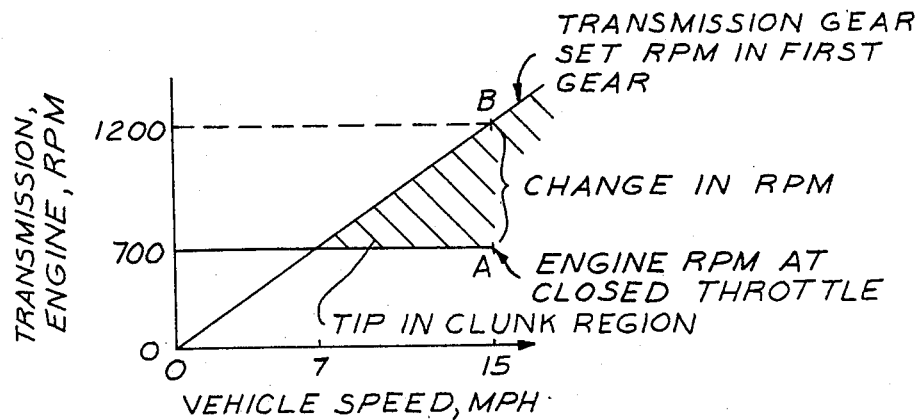
FIG. 1 is a graphical representation of the transmission gearset rpm and the engine rpm both graphed on axes of rpm versus vehicle speed so that when transmission gearset rpm exceeds engine rpm there is shown a shaded tip in clunk region in accordance with the prior art.
Figure 3:
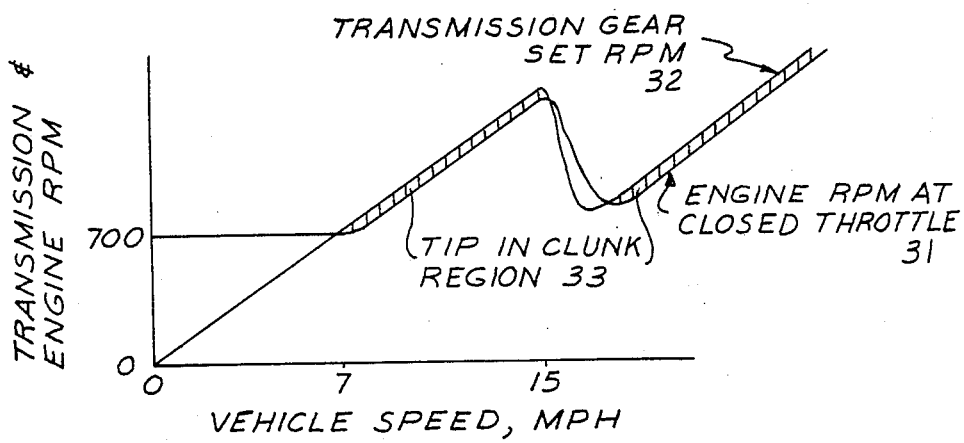
FIG. 3 is a graphical representation of the transmission gearset rpm and the engine rpm versus vehicle speed in accordance with an embodiment of this invention.

Referring to FIG. 3, engine control system 10 operates so that the tip in clunk region which is shaded in FIG. 1 is substantially reduced. The engine rpm 31 closely follows transmission gearset rpm 32 as indicated by the closely following curves of engine rpm 31 and transmission gearset rpm 32 of FIG. 3 and the very reduced shaded area 33 of tip in clunk.

Figure 4:
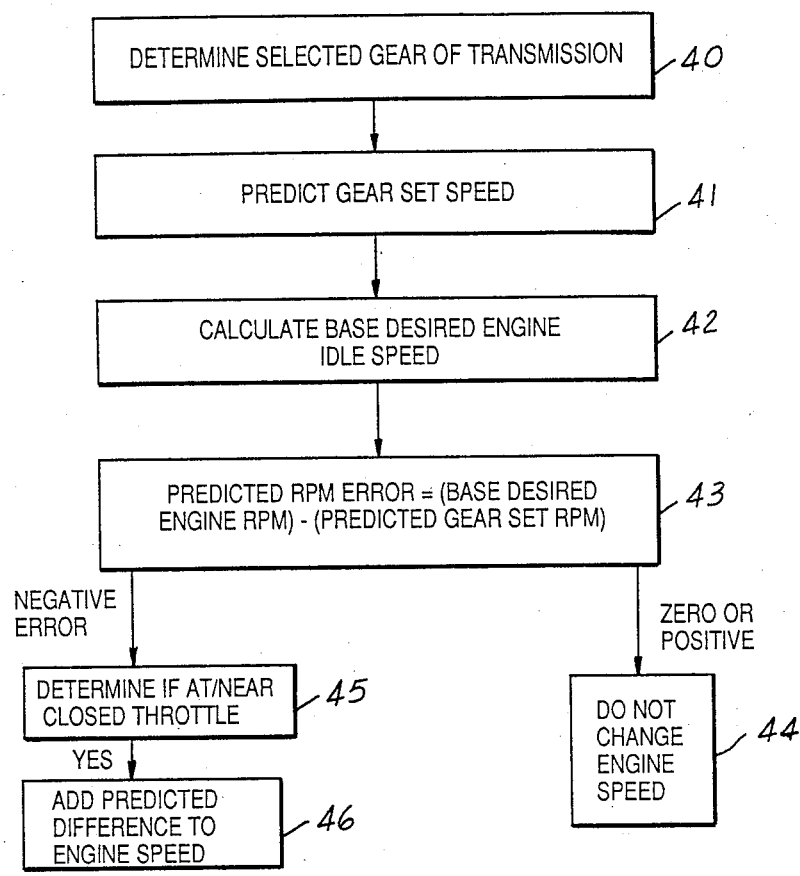
FIG. 4 is a logic flow block diagram of an electronic engine control system in accordance with an embodiment of this invention.

Referring to FIG. 4, a block logic flow for determining whether or not to change engine speed (rpm) includes a determination in block 40 of the selected gear of the transmission. Logic flow then goes to a block 41 wherein the transmission gearset speed in predicted. Advantageously, this is done as a function of vehicle speed. Logic flow then goes to a block 42 wherein the base desired engine idle speed is calculated. Calculation of a base desired engine idle speed to produce an initial engine idle speed is well known and can include the numerous engine operating parameters discussed above. Next, logic flow goes to a block 43 wherein a predicted rpm error is equal to the base desired engine rpm minus the predicted transmission gearset rpm. If the predicted rpm error is zero or positive, logic flow goes to a block 44 where there is no change made to engine speed. On the other hand, if a negative rpm error is calculated, logic flow goes to a block 45 where it is determined whether engine operation is near closed throttle. If operation is not near closed throttle then this engine idle speed correction is not used. If operation is near closed throttle, logic flow goes to a block 46 where there is added the predicted speed (rpm) difference to the engine speed. Such an increase in engine speed reduces any subsequent tip in clunk or jerk.

Figure 5:
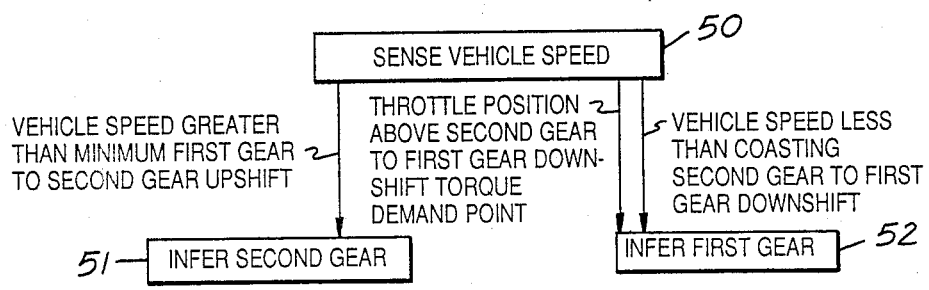
FIG. 5 is a logic flow block diagram of a portion of the logic block diagram of FIG. 4 used for inferring transmission gear in accordance with an embodiment of this invention.

Referring to FIGS. 5 and 8, the determination of the selected transmission gear as recited in block 40 of FIG. 4, can be determined by sensing vehicle speed as indicated in block 50 of FIG. 5, and then inferring second gear at block 51 if the vehicle speed is greater than the minimum vehicle speed required for first gear to second gear upshift point. That is, if vehicle speed, as a function of throttle position, is at a location above the 1-2 upshift curve of FIG. 8. First gear is inferred at block 52 of FIG. 5 if either (1) the throttle position is above the second gear to first gear torque demand downshift point, or (2) vehicle speed is less than the second gear to first gear coasting downshift point. At a constant vehicle speed and increasing throttle opening, the torque demand downshift point occurs when throttle position crosses the "2-1 torque demand downshift curve" of FIG. 8. Referring to FIG. 7, which is discussed further below, this corresponds to an output Q of "0" in response to an input of "0" for S and "1" for C. The "no change region for inferred gear" region of FIG. 8 (between the 1-2 upshift curve and the 2-1 downshift curve) corresponds to the N/C (no change) output of Q in response to "0" inputs for both S and C. The N/C provides a hysteresis so that the inferred gear in the N/C region depends upon the previously inferred gear.

Referring to FIG. 6A, a desired minimum first transmission gear speed versus vehicle speed is shown. Note that there is an increasing slope from about 8 mph to about 14 mph. Advantageously, to prevent erroneous increase in engine speed at other times, the disclosed adjustment of base desired engine speed is restricted to use during such time when vehicle speeds are roughly in the range of 8 to 14 mph.

Referring to FIG. 6B, there is represented, with respect to time a base desired engine rpm 61 and a transmission gearset rpm 62 which is shown to be a constant 675 rpm at a given speed of 9 mph. As time progresses, if the calculation for base desired engine idle rpm goes below the transmission gearset rpm, then an rpm error is generated as in block 45 of FIG. 4. The engine rpm is increased by the amount of such an error. In FIG. 6B, base desired engine rpm (DSDRPM) is greater than transmission gearset rpm until time A. The generated function DSDRPM is less than transmission gearset rpm between time A and time B. At time B, air conditioning is activated and DSDRPM is increased to a magnitude greater than transmission gearset rpm. In accordance with this invention, between time A and time B, the function DSDRPM 61 is incremented by an amount equal to the difference between the gearset rpm 62 and DSDRPM to provide a final adjusted desired engine rpm 63. Thus, the final adjusted desired engine rpm 63 is a function of both the base desired engine rpm and the gearset rpm. As discussed above, the base desired engine rpm is a function of engine operating parameters such as engine coolant temperature, time since start, air charge temperature, air conditioning actuation, power steering actuation, and neutral/drive state.

Advantageously, the logic operating within system 10, in particular within electronic engine control module 11, includes inferring first gear. FIG. 7 gives the truth table for the inputs to the logic for inferring first gear.

The output Q is a binary signal which sets a gear flag. A zero Q output generates a gear flag equal to "1" and indicates first gear. A one Q output generates a gear flag equal to "0" and indicates second gear.

The truth table has an input S value of "1" when vehicle speed is greater than or equal to the minimum required for a first gear to second gear upshift. Input S has a value of "0" when vehicle speed is less than the minimum required for a first gear to second gear upshift. Input C is an OR function of two inputs wherein the first input is equal to "1" if the average vehicle speed is less than the speed required for a second gear to first gear coasting downshift, and is equal to "0" if the average vehicle speed is greater than or equal to the speed required for a second to first gear coasting downshift. The second input for input C is equal to "1" when throttle position is greater than the throttle position for second gear to first gear downshift (i.e. the 2-1 torque demand point), and equal to "0" if throttle position is less than or equal to such torque demand point. As can be seen from the truth table of FIG. 7, Q has a "1" output (indicating second gear) when input S is "1" and input C is either "0" or "1". Output Q is "0" (indicating first gear) when input S is "0" and input C is "1". If inputs S and C are both "0", output Q does not change (N/C) from its previous value.

Transmission gearset speed can be inferred or measured. For example, gearset speed can be inferred using inferred transmission gear and vehicle speed as inputs to a table stored in electronic engine control module 11 of FIG. 2.

FIG. 8 gives the upshift and downshift for various throttle positions versus vehicle speed. In particular, the upper curve defines an upshift from first to second gear (1-2). This upshift occurs at 14 mph when the throttle is closed, as indicated by O TP counts. The lower curve defines a downshift from second to first gear (2-1). This downshift occurs at 8 mph when the throttle is closed. The logic discussed in connection with FIG. 7 infers the transmission gear and assumes a throttle closed so that points lie on the O TP count axis as a function of vehicle speed.

Although discussion has centered on inferring the transmission gear, direct sensing is also possible. Such sensing would occur at the same logical sequence point as the inferring and may be done electronically, mechanically or hydraulically. Sensors for such applications are well known in the art.

Various modifications and variations will no doubt occur to those skilled in the various arts to which this invention pertains. For example, this invention is also applicable to gear shifts between any two transmission gears, such as, for example, first and second gear, second and third gear, etc. These and all other variations which basically reply on the teachings through which this disclosure has advanced the art are properly considered within the scope of this invention.

We claim:

1. A method of controlling engine speed of a vehicle coupled to an automatic transmission including the steps of:
   generating a signal indicating inferred automatic transmission gear; and
   adjusting the engine speed in accordance with said signal.

2. A method controlling engine speed of a vehicle engine coupled to an automatic transmission including the steps of:
   determining a base desired engine speed as a function of engine operating parameters;
   adjusting the base desired engine speed as a function of transmission gearset speed to a final adjusted desired engine speed; and
   adjusting the actual engine speed of the vehicle engine to the final adjusted desired engine speed to reduce the difference between the magnitude of actual engine speed and the magnitude of transmission gearset speed.

3. A method controlling engine speed of an engine for a vehicle used in combination with an automatic transmission to reduce tip in jerk, including the steps of:
   determining the selected gear of the transmission;
   predicting transmission gearset speed;
   calculating base desired engine idle speed;
   predicting an rpm error difference wherein the rpm error difference is equal to the base desired engine speed minus predicted transmission gearset speed;
   establishing that the engine is operating near closed throttle;
   adding the predicted rpm error difference to the base desired engine idle speed if there is a negative rpm error difference thereby determining a final adjusted desired engine idle speed and not changing base desired engine idle speed if there is a zero or positive rpm error difference; and
   adjusting actual engine speed toward the value of the final adjusted desired engine idle speed.

4. A method as recited in claim 3 wherein the step of determining the selected gear of the transmission includes the steps of:
   sensing vehicle speed; and
   inferring the selected transmission gear as a function of vehicle speed, the downshift points between two gears of the transmission, and the upshift points between the same two gears of the transmission.

5. A method as recited in claim 4 wherein the step of inferring the selected transmission gear includes:
   inferring a first transmission gear if vehicle speed is less than that required for a second gear to first gear coasting downshift or the throttle opening position is greater than the second gear to first gear downshift torque demand point for that vehicle speed, and inferring a second transmission gear if the vehicle speed is greater than the minimum vehicle speed for first gear to second gear upshift.

6. An engine control apparatus coupled to an engine of a vehicle used in combination with an automatic transmission for controlling engine speed including:
   calculation means for calculating a base desired engine speed as a function of engine operating parameters; and
   adjustment means for adjusting the base desired engine speed as a function of transmission gearset speed to a final adjusted desired engine speed; and
   engine speed change means to adjust actual engine speed to the final adjusted desired engine speed to reduce the difference between the magnitude of actual engine speed and the magnitude of transmission gearset speed.

7. An engine control apparatus as recited in claim 6 wherein said adjustment means includes:
   determination means for determining the selected gear of the transmission;
   prediction means for predicting the transmission gearset speed;
   error generation means for predicting an rpm error difference wherein the rpm error difference is equal to the base desired engine speed minus the predicted transmission gearset speed;
   throttle condition sensing means for determining that the engine is operating near closed throttle; and
   computation means for adding the predicted rpm error difference to the base desired engine idle speed if there is a negative rpm error difference thereby determining a final adjusted desired engine idle speed and not changing base desired engine idle speed if there is a zero or positive rpm error difference.

8. An engine control apparatus as recited in claim 7 wherein said determination means for determining the selected gear of the transmission includes:
   sensing means for sensing vehicle speed; and
   inferring means for inferring the selected transmission gear as a function of vehicle speed, the downshift points between two transmission gears, and the upshift points between the same two transmission gears.

9. An engine control apparatus as recited in claim 8 wherein said inferring means includes:
   logic means for inferring a first transmission gear if vehicle speed is less than that required for a second gear to first gear coasting downshift or the throttle opening position is greater than the second gear to first gear downshift torque demand point for that vehicle speed and inferring a second transmission gear if the vehicle speed is greater than the minimum vehicle speed for first gear to second gear upshift.

10. An engine control apparatus as recited in claim 7 further including means for electronically sensing the transmission gear.

11. An engine control apparatus as recited in claim 7 further including means for mechanically sensing the transmission gear.

12. An engine control apparatus as recited in claim 7 further including means for hydraulically sensing the transmission gear.

* * * * *